Jan. 14, 1958 H. M. GEYER 2,819,589
FLUID PRESSURE ACTUATOR AND SYNCHRONIZING MEANS THEREFOR
Filed April 1, 1954 2 Sheets-Sheet 1
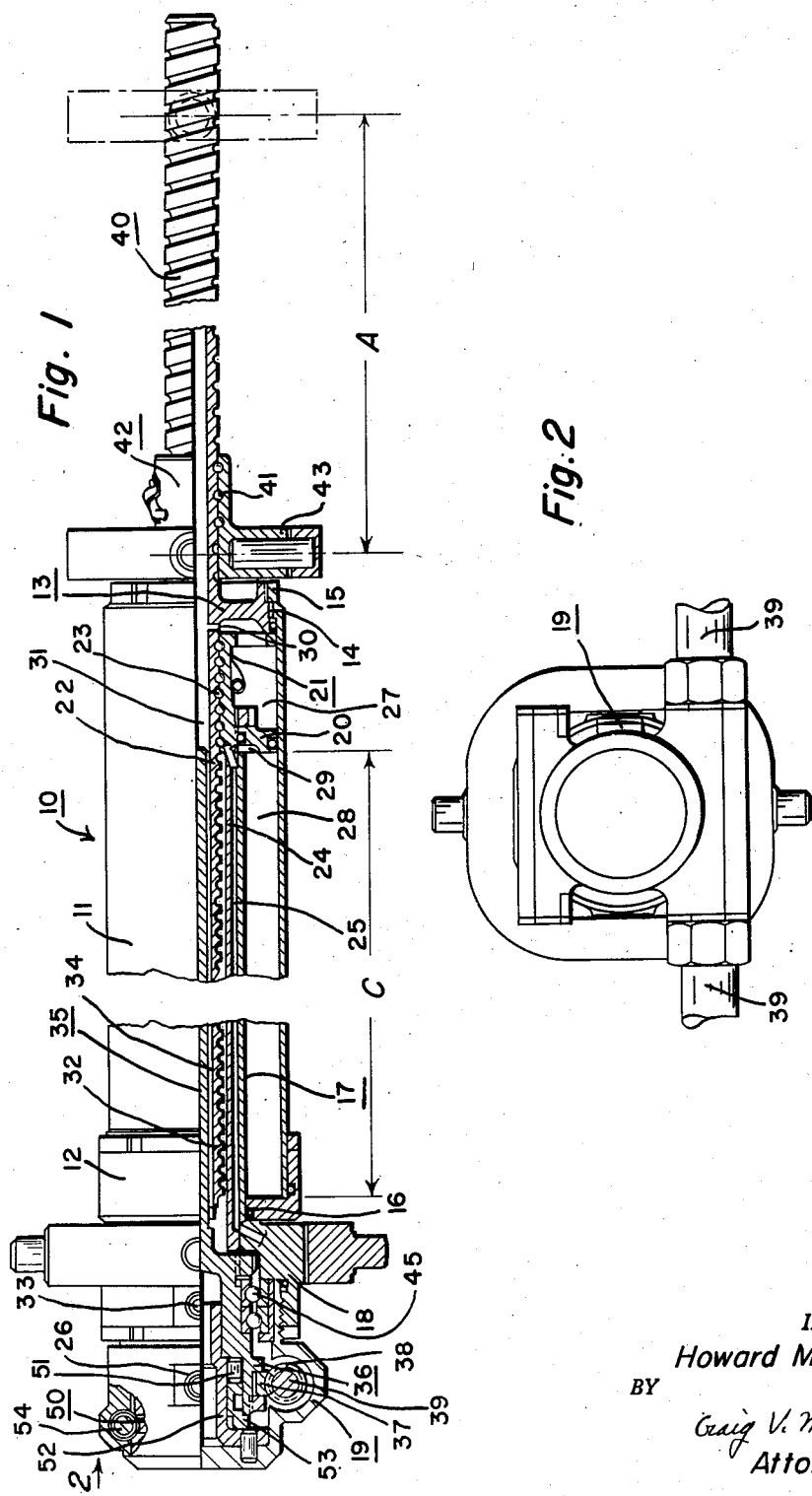
INVENTOR.
Howard M. Geyer
BY
Craig V. Morton
Attorney

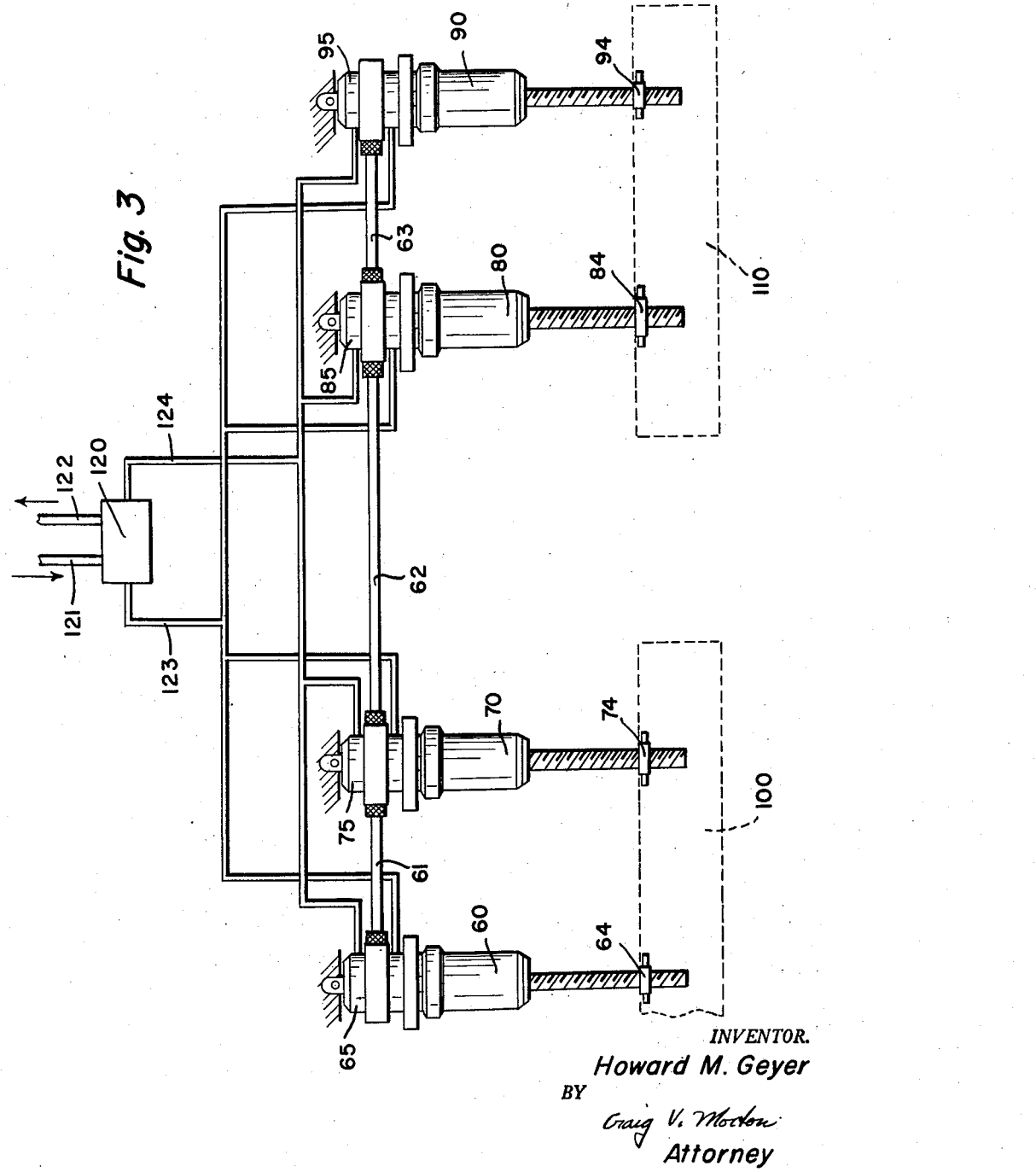

United States Patent Office 2,819,589
Patented Jan. 14, 1958

2,819,589

FLUID PRESSURE ACTUATOR AND SYNCHRONIZING MEANS THEREFOR

Howard M. Geyer, Dayton, Ohio, assignor to General Motors Corporation, Detroit, Mich., a corporation of Delaware Application April 1, 1954, Serial No. 420,320

15 Claims. (Cl. 60—97)

This invention pertains to fluid pressure actuators, and particularly to self-locking actuators having means for effecting synchronous operation thereof with other like actuators.

Heretofore, self-locking fluid pressure actuators have been manufactured which comprise, a cylinder having disposed therein a reciprocable piston capable of fluid pressure actuation in either direction. In this type of actuator, the piston has connected thereto a rod which projects through an end wall of the cylinder for connection to a load device, such an actuator being disclosed in my Patent No. 2,643,642, issued June 30, 1953. In this type of actuator, the overall length thereof, that is the length from the end of the piston rod when the piston is fully extended, to the opposite end of the cylinder, determines the total working stroke of the actuator. However, in some actuator installations, only limited space is available for an actuator, and some means must be provided for increasing the total actuator stroke while maintaining the overall actuator length at a minimum. Accordingly, among my objects are the provision of a fluid pressure operated actuator wherein the total stroke thereof is appreciably greater than the piston stroke; the further provision of a linear actuator of the aforementioned type including releasable locking means; and the still further provision of means for synchronizing the operation of a plurality of actuators of the aforementioned type.

The aforementioned and other objects are accomplished in the present invention by constructing a linear actuator so that the movable actuator element travels a greater distance than the actuator piston stroke. Specifically, the actuator comprises a rotatable and longitudinally movable cylinder having disposed therein a fixed piston. Accordingly, it may be said that the piston is capable of fluid pressure actuation in either direction relative to the cylinder. The piston is attached to fixed supporting structure and has connected thereto a hollow nut member, having a tubular extension coaxially disposed within the cylinder. The piston divides the cylinder into two chambers, and the tubular nut extension is coaxially disposed within a hollow sleeve portion, the annular space therebetween constituting a conduit for the application of pressure fluid to one cylinder chamber. The tubular nut extension is coaxially arranged, and encompasses a rotatable and longitudinally movable screw shaft, which threadedly engages the nut through the agency of a plurality of circulating balls.

The screw shaft is hollow and has formed on its internal periphery straight spline teeth, which engage straight spline teeth on a centrally disposed rod. The hollow screw shaft is employed as a conduit for the flow of pressure fluid to the other actuator cylinder chamber.

The screw shaft within the actuator cylinder has a left-hand thread, and includes a screw shaft portion which extends outside of the actuator cylinder having a closed end and right-hand thread. The external screw shaft has threaded engagement with a reciprocable nut through the agency of a plurality of circulating balls. The exterior nut is restrained against rotation by reason of its connection to a movable load device.

The centrally disposed straight splined rod is operatively associated with locking means of the type disclosed in my copending application, Serial No. 296,607, filed July 1, 1952, now Patent No. 2,705,939, whereby rotation of the rod and the screw shaft is restrained in the absence of fluid pressure application to the cylinder. Means are provided for releasing the locking means concurrently with the application of pressure fluid to either actuator chamber so as to permit rotation of the rod and the screw shaft whereby both the actuator cylinder and screw shaft may rotate and move longitudinally relative to the fixed piston so as to impart longitudinal movement and rotation to the external screw shaft to thereby adjust the position of the movable load device.

Inasmuch as the external screw thread has a substantially greater lead than the internal screw thread, it will be appreciated that the stroke of the cylinder relative to the piston does not determine the total stroke of the actuator. Conversely, the total stroke of the actuator comprises the algebraic sum of the length of the external screw and the stroke of the actuator cylinder, and in this manner, the total working stroke of the actuator is increased without a proportional increase in the overall length of the actuator assembly.

The locking means also has associated therewith a synchronizing shaft, which may be connected to like adjacent actuators whereby movements of all actuators in a given installation may be synchronized. However, in the instant embodiment, synchronization between adjacent actuators can only be effected when the locking means of each actuator are released.

Further objects and advantages of the present invention will be apparent from the following description, reference being had to the accompanying drawings wherein a preferred embodiment of the present invention is clearly shown.

In the drawings:

Fig. 1 is a fragmentary view, partly in elevation and partly in section, of an actuator constructed according to this invention.

Fig. 2 is a view taken in the direction of arrow 2 in Fig. 1.

Fig. 3 is a schematic view illustrating a fluid pressure system for operating a plurality of actuators and synchronizing means therefor.

With particular reference to Fig. 1, an actuator 10 is shown comprising a cylinder 11 having attached thereto an annular cap member 12. The cylinder 11 is also connected to move with a screw shaft assembly 13, the screw shaft assembly and the cylinder 11 being interconnected by splines 14 and a nut 15. The annular member 12 carries sealing means 16, which engage a stationary hollow sleeve member 17 coaxially disposed within the cylinder. The stationary sleeve member has a projecting shoulder portion 18, which is attached to an actuator end cap 19. The actuator end cap is, in turn, adapted to be connected to fixed supporting structure. Accordingly, the sleeve 17 is restrained against all movement.

The sleeve 17 is also connected to a stationary piston 20, which has connected thereto a hollow member 21 having an internal spiral groove of semi-circular cross section. The member 21 constitutes the nut of the well known ball-screw and nut coupling, and threadedly engages an internal screw 22 of the screw shaft assembly 13 through the agency of a plurality of circulating balls 23. The nut 21 also includes a tubular extension 24, which is coaxially disposed within the sleeve 17 so as to form an annular space 25 therebetween. The annular space 25 communicates by suitable passage means, not shown, with a retract port 26 formed within the actuator end cap 19.

The fixed piston 20 divides the cylinder 11 into an extend chamber 27 and a retract chamber 28. The retract chamber communicates by passage means 29 in the piston with the annular space 25, while the extend chamber 27 communicates through passage means 30 and the screw shaft assembly with a central bore 31 of the internal screw shaft 22. The bore 31 of the internal screw shaft 22, or exteriorly threaded rotatable member, is provided with straight spline teeth 32 adjacent one end thereof. The bore 31 also communicates by suitable passage means, not shown, with an extend port 33 formed in the actuator cap member 19. The straight spline teeth 32 of the internal screw shaft 22 engage straight splines 34 formed on a coaxially disposed rod 35, which extends into the bore 31 of the internal screw shaft. The rod 35 also extends into the cap member 19 and includes an annular portion 36, which constitutes a portion of the locking means, to be described. The rod 35 is supported for rotation in member 19 by bearing means 45. The annular portion 36 also carries a worm wheel 37 having operative engagement with a worm 38 formed integral with a shaft 39.

The screw shaft assembly 13 also includes an external screw shaft 40 having a spirally grooved portion of opposite thread to that of the internal screw shaft 22. That is, the internal screw shaft may be of left-hand thread, whereas the external screw shaft would then be of right-hand thread. The external screw shaft 40 has threaded engagement through the agency of a plurality of circulating balls 41 with an external hollow nut member 42 having attached thereto a trunnion assembly 43. The trunnion assembly 43 is adapted for attachment to a movable load device, which restrains rotation of the nut 42. Accordingly, upon rotation of the screw shaft 40, linear movement will be imparted to the nut 42 and the trunnion 43, as well as the load device attached thereto.

The actuator of this invention also includes releasable locking means 50, which are disposed within the actuator cap member 19. The locking means are of the type disclosed and claimed in the aforementioned application, Serial No. 296,607, now Patent No. 2,705,939, and, accordingly, comprise a no-back arrangement including the annular member 36, a plurality of spaced sets of rollers 51 and a cam member 52, which has a plurality of flats, equal in number to the number of roller assemblies, which flats are separated by arcuate portions concentric to the annular member 36. The means for releasing the locking means comprise a fingered member 53 coaxially disposed between the cam member and the annular member, and angularly movable so as to release the no-back locking means so as to permit rotation of the annular member 36 and the rod 35. It will be appreciated that these locking means are bi-directional in nature, that is, the locking means only permit rotation of the rod 35 into one direction at a time. In other words, when the locking means are released to permit clockwise rotation of the rod 45, the locking means are still effective to restrain rotation of the rod 35 in the counterclockwise direction, and vice versa. The locking means 50 are adapted to be partially released by a brake release piston 54 having operative engagement with the fingered member 53 so as to impart angular movement thereto in either direction. As is more particularly set forth in the aforementioned copending application, the locking means are released concurrently with the application of pressure fluid to the cylinder, and more particularly are released to permit rotation of the rod 35 in one direction when pressure is applied to the extend chamber 27 and are released to permit rotation of the rod 35 in the other direction when pressure fluid is applied to the retract chamber 28.

With reference to Fig. 2, it may be seen that the shaft 39 projects outwardly in opposite directions from the cap member 19. The shaft member 39 may be employed to synchronize the operation of a plurality of actuators when the locking means are released. Thus, as is shown in Fig. 3, an actuator installation comprising four actuators 60, 70, 80 and 90 may be synchronized by interconnecting their shafts 39 by flexible cables 61, 62 and 63.

The actuators 60, 70, 80 and 90 are of the type shown in Fig. 1, and, as shown, the movable elements 64, 74, 84 and 94 of the actuators are attached to movable load devices. Actuators 60 and 70 are interconnected with a flap 100, while actuators 80 and 90 are connected by a flap 110. In each instance, the cap members 65, 75, 85 and 95 of the actuators are attached to fixed supporting structure.

Fig. 3 also depicts a typical fluid pressure system for operating a multiple actuator installation, which system includes a control valve 120 having pressure and drain conduits 121 and 122 connected thereto, which conduits are connected to a suitable source of fluid pressure, not shown. The valve unit 120, which may comprise a conventional four-way valve, includes an outlet port, which is connected to an extend line 123 and an outlet port, which is connected to a retract line 124. The extend line 123 is connected to the extend port of each actuator 60, 70, 80 and 90, while the retract line is connected to the retract port of each actuator. As a reference to the aforementioned copending application will indicate, whenever pressure fluid is applied to the extend ports of the actuators, the locking means are released to permit the actuator to be extended, and when pressure fluid is admitted to the retract ports, the locking means are also released to permit actuator retraction. The synchronizing interconnections 61, 62 and 63 between the actuators will be operative to synchronize their movements only when the locking means of each actuator is released. Accordingly, if the locking means of one actuator should fail to release, that actuator would not move in synchronism with the other three. In fact, the actuator in which the locking means fail to release would remain stationary. Thus, the connections 61, 62 and 63 comprise flexible shafts so as to permit movement of one actuator relative to another.

Again referring to Fig. 1, the operation of the actuator will be described. As shown in Fig. 1, the actuator 10 is fully retracted. That is, the movable element, or nut, 21 is positioned in contiguous relation to the cylinder 11. When pressure fluid is admitted to the extend chamber 27, and the rectract chamber 28 is simultaneously connected to drain, the locking means 50 are partially released to permit rotation of the rod 35 and, hence, the screw shaft 22 in a direction to facilitate actuator extension. When pressure fluid is applied to extend chamber 27, the piston being fixed, the cylinder 11 moves lineally relative to the piston 20, and the cylinder 11 can move throughout the distance C, as shown in Fig. 1. Thus, the stroke of the cylinder relative to the piston is equal to the distance C. In moving throughout the distance C, the screw shaft assembly 13 will also move lineally throughout the distance C. However, by reason of the cylinder being threadedly connected with the nut, longitudinal movement of the cylinder 11 will be accompanied by and is dependent upon rotation thereof relative to the piston and nut assembly, thereby causing rotation of the screw shaft assembly 13. Inasmuch as the external nut 42 is restrained against rotation by reason of its connection to a load device, and by reason of the external screw shaft 40 having a greater lead than the internal screw shaft 22, the movable actuator element, or external nut, 42 will move axially throughout the distance $A+C$, while the cylinder only moves throughout the distance C. Thus, the working stroke of the actuator is equal to the algebraic sum of $A+C$, from which it is apparent that the working stroke is appreciably greater than the stroke of the piston relative to the cylinder. Thus, an actuator constructed according to this invention may be conveniently used where the space available for actuators is limited, notwithstanding the fact that the total stroke of the actuator is appreciably greater for a given space than actuators constructed according to my aforementioned Patent 2,643,642.

From the foregoing, it is manifest that the present invention provides an actuator wherein the total working stroke thereof is appreciably greater than the variation in the total overall actuator length. Moreover, the present invention provides such an actuator with releasable locking means for restraining relative movement between the piston and cylinder in the absence of fluid pressure actuation. In addition, the present invention provides means for synchronizing a plurality of such actuators when locking means of each actuator are released.

While the embodiment of the present invention as herein disclosed, constitutes a preferred form, it is to be understood that other forms might be adopted.

What is claimed is as follows:

1. A fluid pressure operated actuator including, a reciprocable and rotatable cylinder having disposed therein a fixed piston, the cylinder being capable of fluid pressure actuation in either direction relative to the piston, and a movable element operatively connected to said cylinder and constrained to reciprocate upon reciprocation of said cylinder, the operative connection between said movable element and said cylinder being such that the stroke of said element is appreciably greater than the stroke of the cylinder relative to the piston.

2. A fluid pressure operated actuator including, a reciprocable and rotatable cylinder having disposed therein a fixed piston, said cylinder being capable of fluid pressure actuation in either direction relative to said piston, a rotatable member carried by and movable with said cylinder and operatively connected to said piston so as to rotate in response to reciprocable movement of said cylinder, and a non-rotatable element operatively associated with said rotatable member such that rotation of said member will impart linear movement to said element.

3. A fluid pressure operated actuator including, a reciprocable and rotatable cylinder having disposed therein a fixed piston, said cylinder being capable of fluid pressure actuation in either direction relative to said piston, a rotatable member carried by and movable with said cylinder and operatively connected with said piston, movement of said cylinder being dependent upon rotation of said member, and a non-rotatable element operatively associated with said member so as to move lineally in response to rotation of said member, said element being constructed and arranged for connection to a movable load device.

4. A fluid pressure operated actuator including, a reciprocable and rotatable cylinder having disposed therein a fixed piston, said cylinder being capable of fluid pressure actuation in either direction relative to said piston, a rotatable assembly comprising internal and external members, said internal member being carried by and movable with said cylinder and operatively connected to said piston so as to rotate in response to movement of said cylinder, and a non-rotatable element operatively connected with said external member so as to move lineally in response to rotation of said assembly upon movement of said cylinder.

5. A fluid pressure operated actuator including, a reciprocable and rotatable cylinder having disposed therein a fixed piston, said cylinder being capable of fluid pressure actuation in either direction relative to said piston, a rotatable assembly including internal and external members, the internal member being carried by and movable with said cylinder and operatively connected to said piston such that movement of said cylinder is dependent upon rotation of said internal member and assembly, a non-rotatable element operatively connected to said external member so as to move lineally in response to rotation thereof, and means constructed and arranged to connect said non-rotatable element with a movable load device.

6. A fluid pressure operated actuator including, a reciprocable cylinder having disposed therein a fixed piston, said cylinder being capable of fluid pressure actuation in either direction relative to said piston, a rotatable assembly comprising internal and external members, the internal member being disposed in said cylinder and operatively connected thereto such that reciprocable movement of said cylinder is dependent upon rotation of said member and assembly, releasable locking means operatively associated with said internal member for restraining rotation thereof in the absence of fluid pressure application to said cylinder, and a non-rotatable element operatively associated with said external member so as to move lineally in response to rotation thereof.

7. A fluid pressure operated actuator including, a reciprocable cylinder having disposed therein a fixed piston, said cylinder being capable of fluid pressure actuation in either direction relative to said piston, a rotatable assembly comprising internal and external members, the internal member being disposed in said cylinder and having operative connection with the cylinder and piston such that relative movement between said cylinder and piston is dependent upon and effects rotation of said internal member and said assembly, locking means operatively associated with said internal member for preventing rotation thereof and consequent relative movement between said cylinder and piston in the absence of fluid pressure actuation thereof, means to release said locking means so as to permit rotation of said internal member upon the application of pressure fluid to said cylinder, and a nonrotatable element operatively connected with said external member so as to move lineally in response to rotation thereof.

8. A fluid pressure operated actuator including, a reciprocable cylinder having disposed therein a fixed piston, said cylinder being capable of fluid pressure actuation in either direction relative to said piston, means operatively interconnecting said cylinder and said piston including a rotatable member attached to said cylinder and having threaded engagement with said fixed piston whereby relative reciprocation between said cylinder and said piston effects rotation of said cylinder relative to said piston, and releasable locking means operatively associated with said rotatable member for preventing rotation thereof and thereby preventing relative movement between said cylinder and said piston.

9. A fluid pressure operated actuator including, a reciprocable cylinder having disposed therein a fixed piston, said cylinder being capable of fluid pressure actuation in either direction relative to said piston, a rotatable member disposed in said cylinder having operative connection with both the cylinder and piston so as to rotate relative to the piston and effect rotation of the cylinder upon reciprocable movement of said cylinder, a rod disposed in said cylinder and connected to rotate with said member, and releasable locking means operatively associated with said rod for preventing rotation of said rod and member in the absence of fluid pressure application to said cylinder.

10. A fluid pressure operated actuator including, a lineally movable cylinder having disposed therein a fixed piston, said cylinder being capable of fluid pressure actuation in either direction relative to said piston, a rotatable and longitudinally movable assembly comprising internal and external members, the internal member being disposed within said cylinder and having operative connection with the cylinder and piston such that linear movement of said cylinder relative to said piston is dependent upon rotation of said internal member and said assembly, rotation of said internal member effecting rotation of said cylinder, linear movement of said cylinder effecting linear movement of said assembly, and a nonrotatable element operatively associated with said external member so as to move lineally in response to rotation thereof.

11. The combination set forth in claim 10 wherein the operative connection between said external member and said non-rotatable element comprises a threaded coupling.

12. A fluid pressure operated actuator including, a lineally movable cylinder having disposed therein a fixed piston, said cylinder being capable of fluid pressure actuation in either direction relative to said piston, a rotatable and longitudinally movable assembly comprising internal and external members, the internal member being disposed within said cylinder and having operative connection with the cylinder and piston such that linear movement of said cylinder relative to said piston is dependent upon rotation of said internal member and said assembly, rotation of said internal member effecting rotation of said cylinder, linear movement of said cylinder effecting linear movement of said assembly, a nonrotatable element operatively connected to said external member so as to move lineally in response to rotation thereof, and releasable locking means operatively associated with said rotatable assembly for preventing rotation thereof and thereby preventing relative movement between said cylinder and said piston.

13. The combination set forth in claim 10 wherein said internal member comprises a screw shaft having a left-hand thread and wherein said external member comprises a screw shaft having a right-hand thread, the lead of said external screw shaft being greater than the lead of said internal screw shaft whereby the total linear stroke of said non-rotatable element is appreciably greater than the linear stroke of the cylinder relative to the piston.

14. A fluid pressure operated actuator including, a linerally movable cylinder having disposed therein a fixed piston, said cylinder being capable of fluid pressure actuation in either direction relative to said piston, a rotatable and longitudinally movable assembly comprising internal and external members, the internal member being disposed within said cylinder and having operative connection with the cylinder and piston such that linear movement of said cylinder relative to said piston is dependent upon rotation of said internal member and said assembly, rotation of said internal member effecting rotation of said cylinder, linear movement of said cylinder effecting linear movement of said assembly a nonrotatable element operatively associated with said external member so as to move lineally in response to rotation thereof, said internal member comprising a screw shaft having a left-hand thread, said external member comprising a screw shaft having a right-hand thread, the lead of said external screw shaft being greater than the lead of said internal screw shaft whereby the total linear stroke of said non-rotatable element is appreciably greater than the linear stroke of the cylinder relative to the piston, and releasable locking means operatively associated with said internal screw shaft for preventing rotation thereof and thereby preventing relative movement between said cylinder and said piston.

15. In combination with a plurality of actuators, each comprising, a cylinder and a piston disposed in said cylinder, said piston and cylinder being capable of relative reciprocable movement under the urge of fluid pressure in either direction, a member rotatably supported within the cylinder and operatively connected to the piston such that said member will rotate in response to relative movement between the piston and cylinder, releasable locking means operatively associated with said member for preventing rotation thereof and consequent relative movement between said piston and cylinder in the absence of fluid pressure application to said cylinder, and means interconnecting the rotatable members of adjacent actuators through said locking means for effecting synchronous operation thereof only when the locking means of all actuators are released.

References Cited in the file of this patent

UNITED STATES PATENTS

| | | |
|---|---|---|
| 1,643,563 | Nell | Sept. 27, 1927 |
| 1,650,383 | Osgood | Nov. 22, 1927 |
| 1,700,468 | Clutter et al. | Jan. 29, 1929 |
| 2,036,967 | Lundberg et al. | Apr. 7, 1936 |
| 2,243,656 | Shannon | May 27, 1941 |
| 2,439,368 | Munschauer | Apr. 16, 1948 |
| 2,491,945 | Baker et al. | Dec. 20, 1949 |
| 2,523,053 | Obrist | Sept. 19, 1950 |
| 2,657,539 | Geyer | Nov. 3, 1953 |
| 2,688,232 | Geyer | Sept. 7, 1954 |

FOREIGN PATENTS

| | | |
|---|---|---|
| 605,790 | Germany | Nov. 28, 1934 |
| 644,424 | Great Britain | Oct. 11, 1950 |